United States Patent
Brackney (10) Patent No.: US 8,830,267 B2
(45) Date of Patent: Sep. 9, 2014

(54) AUGMENTED REALITY BUILDING OPERATIONS TOOL

(75) Inventor: Larry J. Brackney, Denver, CO (US)

(73) Assignee: Alliance for Sustainable Energy, LLC, Golden, CO (US)

( * ) Notice: Subject to any disclaimer, the term of this patent is extended or adjusted under 35 U.S.C. 154(b) by 281 days.

(21) Appl. No.: 12/946,455

(22) Filed: Nov. 15, 2010

(65) Prior Publication Data

US 2011/0115816 A1    May 19, 2011

Related U.S. Application Data

(60) Provisional application No. 61/261,654, filed on Nov. 16, 2009.

(51) Int. Cl.
   *G09G 5/00*    (2006.01)

(52) U.S. Cl.
   USPC .......................................... 345/633; 345/632

(58) Field of Classification Search
   None
   See application file for complete search history.

(56) References Cited

U.S. PATENT DOCUMENTS

| | | | | |
|---|---|---|---|---|
| 6,692,349 | B1 * | 2/2004 | Brinkerhoff et al. | 454/256 |
| 8,280,405 | B2 * | 10/2012 | Sanz-Pastor et al. | 455/456.2 |
| 2005/0275525 | A1 * | 12/2005 | Ahmed | 340/524 |
| 2007/0081695 | A1 * | 4/2007 | Foxlin et al. | 382/103 |
| 2010/0321389 | A1 * | 12/2010 | Gay et al. | 345/427 |

OTHER PUBLICATIONS

Lee, "The Virtual-Augmented-Reality Environment for Building Commission: Case Study", Proceedings of the Fifth International Conferene for Enhanced Builidng Operations, Pittsburgh, Pennsylvania, Oct. 11-13, 2005.

Lee "The Development of an Augmented-Reality-Based Data Visualization System for Commissioning of Air Handling Units", International Conference on Construction Applications of Virtual Reality, Oct. 22-23, 2007.

(Continued)

*Primary Examiner* — James A Thompson
(74) *Attorney, Agent, or Firm* — John C. Stolpa; Michael McIntyre (57) ABSTRACT

A method (700) for providing an augmented reality operations tool to a mobile client (642) positioned in a building (604). The method (700) includes, with a server (660), receiving (720) from the client (642) an augmented reality request for building system equipment (612) managed by an energy management system (EMS) (620). The method (700) includes transmitting (740) a data request for the equipment (612) to the EMS (620) and receiving (750) building management data (634) for the equipment (612). The method (700) includes generating (760) an overlay (656) with an object created based on the building management data (634), which may be sensor data, diagnostic procedures, or the like. The overlay (656) is configured for concurrent display on a display screen (652) of the client (642) with a real-time image of the building equipment (612). The method (700) includes transmitting (770) the overlay (656) to the client (642).

10 Claims, 7 Drawing Sheets

(56) References Cited

OTHER PUBLICATIONS

Milgram, P. et al., "A Taxonomy of Mixed Reality Visual Displays," IEICE Trans. Inf. & Syst., VE77-D, No. 12, pp. 1321-1329, 1994.
Azuma, R.T., "A Survey of Augmented Reality," Presence: Teleoperators and Virtual Environments, pp. 355-385, Aug. 1997.
"Visualizing Building Information," Centerline: Newsletter of the Center for the Built Environment at the University of CA, Berkeley, pp. 3-9, Winter, 2009.
"Energy Impact of Commercial Building Controls and Performance Diagnostics: Market Characterization, Energy Impact of Building Faults and Energy Savings Potential," Prepared by Tiax LLC for the U.S. Dept. of Energy Building Technologies Program, pp. 10-3-10-6, Nov. 2005.
Clayton, D., et al., "Building Automation Systems Worldwide Outlook: Market Analysis and Forecast Through 2006," ARC Advisory Group, p. 3-4, 2002.
http://www.acrossair.com/ accessed Dec. 27, 2012.
http:/layar.com/ accessed Dec. 27, 2012.
http://mashable.com/2009/08/27/yelp-augmented-reality/ accessed Dec. 27, 2012.
http://www.hitl.washington.edu/artoolkit/ accessed Dec. 27, 2012.
http://www.artoolworks.com accessed Dec. 27, 2012.

* cited by examiner

AUGMENTED REALITY BUILDING OPERATIONS TOOL

CROSS-REFERENCE TO RELATED APPLICATIONS

This application claims the benefit of U.S. Provisional Application No. 61/261,654, filed Nov. 16, 2009, which is incorporated herein by reference in its entirety.

CONTRACTUAL ORIGIN

The United States Government has rights in this invention under Contract No. DE-AC36-08GO28308 between the United States Department of Energy and the Alliance for Sustainable Energy, LLC, the Manager and Operator of the National Renewable Energy Laboratory.

BACKGROUND

Building system faults are often difficult to diagnose. As a result, many building systems, such as heating and air conditioning systems, run in undesired operating ranges leading to discomfort for building tenants or occupants and/or run in ways that interfere with operation of a highly efficient building. Underperformance of building components is a common and widespread contributor to poor energy efficiency, which can significantly increase operating and energy costs for the building. Such costs quickly multiply for organizations managing operation of large numbers of buildings that may be located throughout a geographically dispersed area, with the size of buildings and their widespread locations making central and coordinated management more difficult.

Underperforming building systems and equipment often go undiagnosed by building maintenance personnel because each component is typically a small part of a much larger and more complex system (e.g. changing a setting of one fan or one heating unit can affect other components and conditioned building zones), because the training of building owners and equipment operators is lacking or simply inaccurate, or because the commissioning, diagnostic, and maintenance procedures provided for identifying an underperforming or "broken" piece of building equipment is difficult to execute.

Recently, there has been a growing urgency to operate building systems with more energy efficiency such as with automated control and monitoring of heating, ventilation, and lighting needs of a building or group of buildings such as office buildings, factories, educational campuses, retail malls, and the like. To increase efficiency and try to identify the underperforming or broken system components or systems, many building owners or operators have implemented building management systems (or energy management systems (EMSs)). Building management systems are computer-based control systems installed in buildings to monitor and control one or more of the buildings' mechanical and electrical equipment such as ventilation, lighting, and power systems. Some estimates have indicated that the systems linked to and controlled by a building management system may represent 40 percent of a building's energy usage and may represent up to 70 percent of the energy usage when lighting is included. Even small improvements in the effectiveness of a building management system can provide large improvements in energy efficiency and cost savings for operating a building.

As one exemplary function, a building management system may control heating and cooling including managing the systems that distribute air throughout a building. This may involve remotely controlling operation of fans, opening/closing dampers, adjusting a temperature setting on a cooling or heating unit, and so on to try to achieve a desired room temperature. The building management system (or building EMS) receives data from numerous sensors on or near system components and stores this monitored data in a management database (e.g., air flow rate in a ventilation duct downstream of a damper, a temperature in a building space, a setting of a heating or cooling unit). The building management system may then process this received data to operate one or more components or to identify a fault condition that may require maintenance.

Unfortunately, there are a number of issues with existing building management systems. Due to the large number of monitored components and possible fault conditions, many faults or alerts that may indicate an underperforming piece of equipment are simply ignored or left unchecked/unresolved. For example, the sensor information may indicate that a building space is out of a desired temperature range, but, unless there are occupant complaints, the building operator, with limited resources and time, may ignore this alert even though it may indicate a piece of equipment is operating inefficiently (e.g., too much cooling or heating being used).

Another problem arises when a building operator attempts to tune or adjust operation or to perform diagnostics on a piece of building equipment. Often, the building management system has to be accessed via a terminal at or linked to the data storage device storing the management database. For example, a worker may be required to type in a particular component identifier for the equipment or system in question, such as by retrieving building drawings and then entering a specific variable name associated with the component into a user interface screen. This may result in the building management system providing the worker with the operating data for the component received from monitored sensors, and the worker can then print out or write down this data for use in making adjustments or diagnostics on the component. If tuning or operational testing is required, a second worker may be sent to a remote location in the building to operate a controller on the component or piece of equipment or to make a series of measurements while the first worker remains at the building management system terminal. The two workers communicate via wireless devices (e.g., radios, cellular phones, or the like) to determine if adjustments or tuning has desirably changed the operation of the system (e.g., by partially closing a valve did this cause the temperature in a duct or building space to move into a desired range?). This trial and error approach combined with the need of two workers is generally inefficient and sometimes ineffective in tuning the component to work efficiently or in properly performing component or system diagnostics.

The foregoing examples of the related art and limitations related therewith are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tools and methods that are meant to be exemplary and illustrative, not limiting in scope. In various embodiments, one or more of the above-described problems have been reduced or eliminated, while other embodiments are directed to other improvements.

Briefly, methods and systems are described that provide a building operator using a mobile client device, such as a smart phone, an augmented reality (AR) building operations tool (ARBOT). The building management systems include an ARBOT server that is communicatively linked with a building's energy management system (EMS), which acts in conventional manner to manage a large database with records for building system equipment that provide operating data for each piece of equipment (e.g., sensor-collected data) as well as other building management data (e.g., maintenance procedures, operating historical trends, and the like).

During operation of a building management system, the client may be operated to capture a real-time image of a piece of building system equipment (e.g., a chiller, a ventilation component, a light element, and so on), and this image or other information from the client (such as position information) may be used by the client or ARBOT server to determine the identification of the equipment. The ARBOT server uses this identification to request data from the EMS database for the equipment, and, with this information, creates an overlay of building management data that it transmits to the client for display concurrently with the real-time image of the equipment (e.g., a graphical and/or textual element positioned in the display near the equipment providing useful building management data). The operator of the client may then interact with the overlay objects (selectable icons/buttons or a graphical user interface (GUI)) to retrieve additional building management data such as use case-driven information that may include providing the operator with an actuator-in-hand to tune a controller of the equipment.

The ARBOT-based building management systems provide a convenient and intuitive multi-function user interface on the client with a supporting framework for effective human and building interactions. AR technology is used along with existing building automation systems and a relational database to overlay a new and useful set of performance data, operations and maintenance guidance, a mechanism for interacting with the building (e.g., an actuator-in-hand), and/or other building management data where the technician or operator of the client is physically located (e.g., proximate to building system equipment).

Prior technology relies on centrally located terminals at or near the EMS, screens of scalar data points, and trend logs to attempt to effectively operate a building's systems, and these are neither human centric nor context centric. As a result, failure alarms/alerts were typically ignored and building systems performed sub-optimally for energy efficiency and other purposes. In contrast, the building management systems described herein provide technicians building management data on site and in real-time while they are inspecting/maintaining building equipment. The client interface provides ease of use for technicians with minimal training and experience in diagnostics, commissioning, and maintenance.

The ARBOT server operates with the client and EMS to provide information at the point where it is most needed (e.g., where the equipment and technician are located). The ARBOT-based building management system may provide increased potential for energy savings by providing actionable guidance along with information about failures or poor performance (e.g., all such data may be part of the building management data provided by the ARBOT server to the mobile client for display in one or more overlays over the real-time image of the equipment). Further, the system may be configured to provide seamless interaction with enterprise level logistics systems for parts ordering, maintenance scheduling, and so on. For example, a technician may click or select an icon/button on a touch screen or interact with a GUI (which may be the overlay or a separate window of the client display) to have the ARBOT server (or client) store in memory a further action item for the equipment such as to perform a later operational check on an underperforming piece of equipment, to order a replacement part and install it upon receipt, to perform diagnostics or maintenance, or the like.

More particularly, a method is provided for delivering an augmented reality operations tool to a mobile client being used by a building maintenance technician. The method includes, with an augmented reality building operations tool (ARBOT) server, receiving from the mobile client an augmented reality request for equipment of a building system managed by an energy management system (EMS). Then, the method includes, with the ARBOT server, transmitting to the EMS a data request for the equipment, and in response, receiving from the EMS building management data for the equipment. The method further includes, with the ARBOT server, generating an overlay with at least one object with graphical and/or textual portions based on the building management data. The building management data overlay is configured for concurrent display on a display screen of the mobile client with a real-time image of the equipment in the building. The method further includes transmitting the overlay to the mobile client for display with the real-time image of the equipment.

In the method, the data request may include an identification of the equipment, and the building management data may include collected data from a sensor in the building operating to monitor operation of the identified equipment or information synthesized from multiple measurements along with embedded performance models. Further, in the method, the identification of the equipment may be determined by processing a fiducial marker in the real-time image (e.g., the client or the ARBOT server may perform identification of the marker and then perform a lookup of the mark in a database to find the equipment identification associated with the marker as well as the X-Y-Z coordinates of the marker for later mapping of the overlay object to the marker in the real-time image). In this regard, the overlay object may be mapped to the position of the equipment in the real-time image with the overlay including X-Y positional coordinates for each object in the overlay to locate their display relative to the corresponding pieces of equipment in the real-time image presently being displayed on the client.

The method may further include, after the transmitting of the overlay to the mobile client, receiving a client interaction request from the mobile client based on a selection of a portion of the overlay and, in response, operating the ARBOT server to obtain additional building management data for the equipment and to provide the additional building management data to the mobile client for display on the display screen. In such cases, the additional building management data may include an actuator-in-hand associated with the equipment (i.e., a tool that allows the operator to remotely tune or otherwise control operation of the actuator via the mobile client), and the additional building management data may be presented to the mobile client as an additional overlay on the display screen. In some implementations of the method, the overlay may include a selectable icon/button requesting or useful for receiving operator input. In such implementations, the ARBOT server may respond to selection of the icon by storing in memory an action item associated with the equipment.

In addition to the exemplary aspects and embodiments described above, further aspects and embodiments will become apparent by reference to the drawings and by study of the following descriptions.

BRIEF DESCRIPTION OF THE DETAILED DRAWINGS

Exemplary embodiments are illustrated in referenced figures of the drawings. It is intended that the embodiments and figures disclosed herein are to be considered illustrative rather than limiting.

DESCRIPTION

The following provides a description of exemplary methods and systems for improving building system management through the use of augmented reality (AR) techniques and tools. To this end, building management systems are taught that each include an AR building operations tool (ARBOT) server that is communicatively linked with a building management system or building energy management system (EMS). The building EMS may be a conventional system storing data received from management sensors as well as other diagnostic and operational data for building systems and components/equipment of each system.

The building management systems also include ARBOT clients such as smart phones or other wireless communication devices that are carried by operators, and the operators use these ARBOT clients to identify a building system or piece of equipment such as by using the client's camera to capture digital images of the equipment including information such as a fiducial marker that is used by the client or the ARBOT server to identify the system and/or system equipment. The ARBOT server then accesses the building EMS database with the system/equipment ID to retrieve building management data linked to the identified system/equipment. The ARBOT server then generates an AR overlay or building management overlay that includes digital objects with building management data or information and that are mapped to the location of the equipment/systems in the digital image (e.g., to coordinates of the fiducial marker in the image or the like).

The ARBOT server acts to transmit the created overlay to the ARBOT client that parses this information and updates its display to provide the overlay on the displayed image of the systems/equipment with the digital objects including the building management information mapped or located near or relative to the corresponding systems/equipment (a text box with sensor data shown near a piece of operating equipment targeted by the client's camera). The operator may, in some cases, then select (or click) on buttons or input icons of the overlay to request further (or specific) information on a particular system/component (e.g., a diagnostic procedure for a broken or underperforming piece of equipment, a set of tuning steps for a controller, a history of faults for a system, and so on) to be able to interact with and access the building EMS database and its wealth of information for building management while onsite or at the location of the operating equipment.

In this manner, augmented reality techniques popularized on mobile smart phones may be applied to the problem of building system management. The building management system with an ARBOT server and mobile clients is envisioned as providing a transformative tool for commissioning, monitoring, and interacting with building systems to provide a higher level of operating efficiency over a facility's useful life. A client-server model is used to transparently provide building operators with contextually useful information regarding building performance while onsite and proximate to the corresponding building equipment. This information may include stored sensor data and may further include (as part of an initial overlay or a supplemental/requested overlay) diagnostic and/or prognostic data and system repair guidance.

In some cases, the client may be an inexpensive mobile computing device such as a smart phone, a personal digital assistant (PDA), or the like that is capable of capturing image data from the building environment. Sensed positional information or visual markers placed on key locations or the equipment itself are used (via processing of the image data) to identify equipment of interest and to register the location of the equipment in the image or display frame. Equipment in the field of view of the client's camera is communicated wirelessly to the ARBOT server, which is connected to the building EMS. The ARBOT server retrieves relevant sensor information from the building EMS database based on equipment identified by the client (or by the ARBOT in thinner client implementations). This sensor/building management data is synthesized into relevant reporting or diagnostic information appropriate to the operator context and transmitted back to the client as an overlay (or as digital objects and relational coordinates that are then used by the client's software to create the overlay).

The client then overlays this information on the video frame being displayed on its display or touch screen in a highly graphical, easily interpreted manner (e.g., with graphical and textual information in digital objects provided near or linked to displayed pieces of equipment/systems). The context is further enhanced by giving the operator mechanisms for interacting with the equipment through the client's touch screen (e.g., request a controller tuning procedure, request by clicking on a button an actuator in hand with a slider or the like shown in the client's display that allows the operator to operate an actuator via the building EMS).

Figure 1:
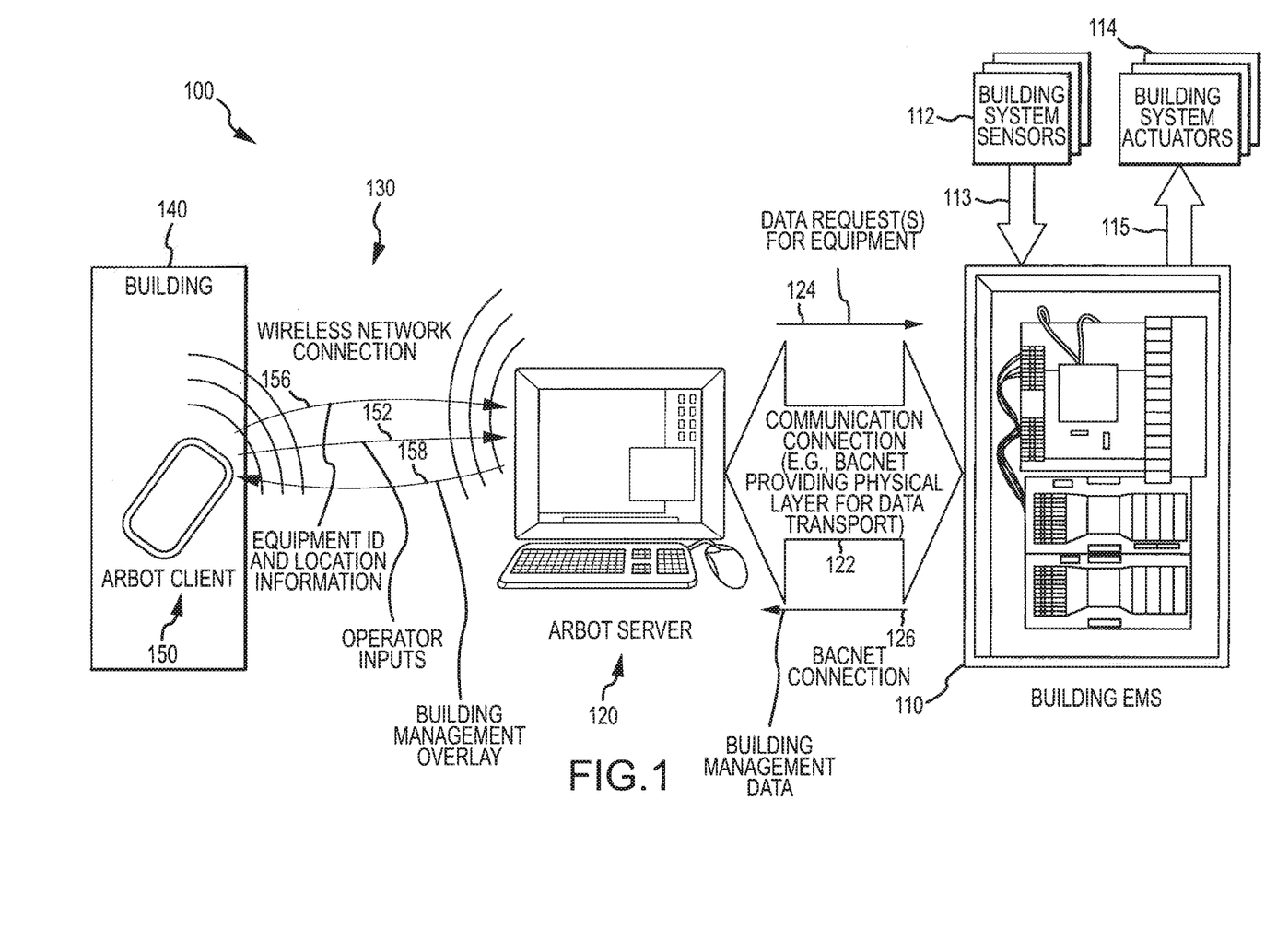
FIG. 1 illustrates a building management system implementing an augmented reality (AR) building operations tool or method (ARBOT) and shows, schematically, data communicated between elements of the system including an ARBOT client, an ARBOT server, a building EMS, and building system sensors and actuators.

FIG. 1 illustrates a building management system 100 configured to make use of AR to enhance management of building systems. As shown, the system 100 includes a building EMS 110 that may be a computer system (hardware including one or more processors and software including any of a number of EMS software suites or applications) and data storage/memory for storing an EMS database (e.g., a database with records for each monitored/managed system and its equipment with equipment IDs linked to sensor data and with management data such as manufacturer-provided data and the like). The building EMS 110 is communicatively linked with building system sensors 112 positioned in a building 140 being monitored and functioning to collect a variety of operating information for managed systems and equipment such as temperatures, air flows, pressures, energy uses, and so on. The sensors 112 transmit this data 113 to the building EMS 110 for parsing and storing in the EMS database in the records of the equipment corresponding with the sensors 112. The building EMS 110 also includes hardware and/or software to remotely control via signals 115 a set of building system actuators 114 (located in building 140 to operate the building systems and equipment) such as to actuate a chiller, to operate a fan at a particular speed, to close a damper, and so on.

With greater interest to the present description, the system 100 includes an ARBOT server 120 that communicates over wireless network 130 with one or more ARBOT clients 150 in building 140 (which includes being on or outside building 140 such as for outdoor-located systems/equipment considered part of building 140 and its systems). The functioning of the ARBOT server 120 and client 150 are described in more detail below with use of several exemplary use cases. However, at this point, it may be useful to understand that the server 120 includes hardware and software for receiving and processing communications 152 from the ARBOT client 150 that may include an operator's request for building management data for equipment in a portion of building 140 and, later, requests for additional information for particular pieces of equipment (e.g., for equipment identified in the overlay as underperforming or performing in an unexpected/undesired manner). The communications 156 from client 150 may include useful information for determining which equipment is of interest to the operator of client 150, and this information may be digital image data from the camera of client 150 that the ARBOT server 120 processes to identify the equipment (by a fiducial marker, by location of the client 150, and so on).

The ARBOT server 120 then uses this equipment ID to retrieve useful information with a data request 124 (that may include the equipment ID or IDs) transmitted over a communication link 122 to the building EMS 110. The communication link 122 may use a standard communications protocol such as BACnet for building automation and control networks. The building EMS 110 uses its hardware/software to access the EMS database to retrieve sensor or other building management data for the equipment listed in the request 124 and returns this at 126 over link 122. The ARBOT server 120 then processes the building management data 126 to create digital objects for an overlay onto the displayed image of the client 150. The digital objects may include graphical icons or information (such as flow arrows for ventilation and piping) and/or textual information (such as sensor readouts, fault indications, historical operating data, and other building management data). The digital objects typically are mapped or aligned with positions of the corresponding equipment in the displayed image (such as with an X-Y-Z coordinate relative to a determined location of a piece of equipment or its fiducial marker). These digital objects and coordinate data may be transmitted at 158 to the client for use in creating an overlay that is displayed over the image presently being displayed in the client's display/touch screen. Alternatively, the server 120 may create the overlay for transmittal at 158 and later display by the ARBOT client. Hence, the "overlay" provided by the server 120 to the client 150 may be the information needed to create the final overlay or be the overlay itself that can be displayed by the client 150 concurrently with images captured by the client's camera.

The system addresses the need for better diagnostics and tuning of underperforming or broken building systems by providing a novel operations tool based on AR technology. The system 100 transforms how operators achieve maximum building efficiencies by making key building management information readily available in relevant contexts (e.g., feeding the information to the operator while that operator is located near the building equipment). AR represents a combination of technologies used to blend digital information with real-time images to create a richer experience for users than if they look only at the live images. The overlay includes visual objects with building management information that the user cannot directly detect with their own senses, and the information provided by the overlay helps the operator/user to perform a real world task such as equipment maintenance or specifying more desirable operational settings in a controller (e.g., tuning gain of a controller). The client 150 (e.g., a smart phone) may include embedded geographical position system (GPS), accelerometry, compass, and video camera components and functionality and provide data from these components in the communications/signals 156 provided over wireless network connection 130 to ARBOT server 120. The ARBOT may use this information to identify equipment in its request 124 and to map digital visual objects, including building management data 126, to the equipment in the displayed image via the building management overlay 158 returned to the client 150, e.g., to provide contextually relevant and useful building management information in the live video provided to the user on the display screen of the client 150.

Figure 2:
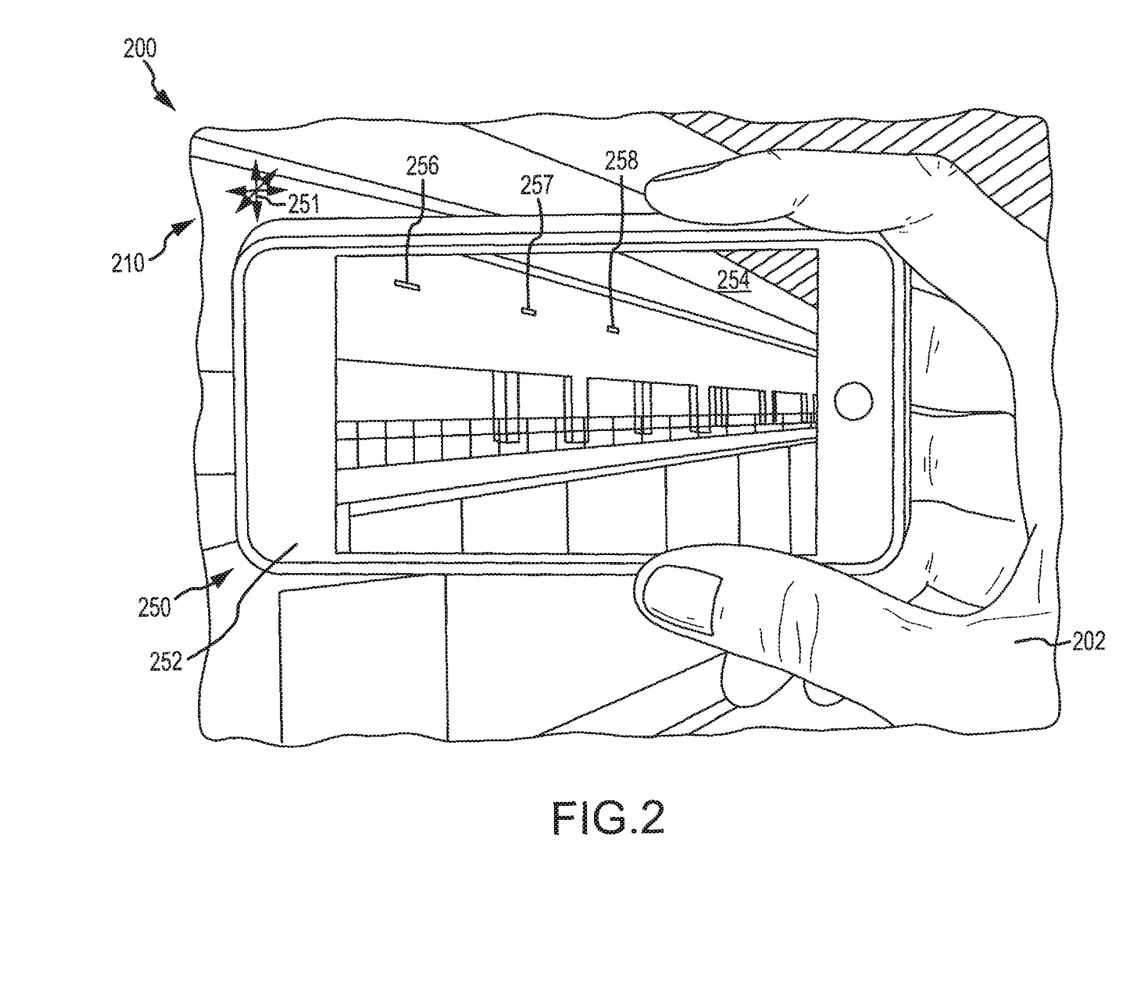
FIGS. 2 and 3 show a portion of a building management system in a use case or example with the ARBOT server acting (in FIG. 3) to provide a building management overlay (based on equipment ID/location data from a client in FIG. 2) that is displayed by the client on a live image displayed on its display screen.

At this point, it may be useful to provide several use cases for an ARBOT such as provided by system 100. For example, FIG. 2 illustrates a portion of a building management system 200 showing a building 210 and an operator 202 operating an ARBOT client 250 within the building 210 to communicate with an ARBOT server and, via the server, an EMS system (the latter two components not shown but understood as being part of system 200 based on the above discussion of system 100). As shown, the client 250 may take the form of a smart phone or similar wireless and portable computing device. The client 250 includes a body with a display or touch screen 252, and the client 250 functions (such as with a camera) to display a video image 254 of the building 210. The displayed image 254 may include one or more pieces of building equipment that is monitored by system 200 such as three supply air diffusers 256, 257, 258. In this first state or phase of operation of system 200, the building operator may be performing a routine walkthrough of a shopping mall 210 and be panning 251 their smart phone or client 250 until she targets or points the focus lens of the client's camera at the supply air diffusers 256, 257, 258.

In a next stage, the operator may operate the client 250 to request (such as by selecting a data request button in a displayed user interface or the like), or such request may be performed automatically by software on client 250, building management information on the diffusers 256, 257, 258 from a communicatively-linked ARBOT server. The ARBOT server identifies the three diffusers 256, 257, 258 by location of client 250 in building 210 and/or by some ID marker (not shown in FIG. 2) positioned on or proximate to one or more of the diffusers 256, 257, 258 and, using these identifications, requests building management data from a building EMS serving the building 210. Upon its receipt, the ARBOT server creates an overlay (or data for such overlay) including digital objects associated with each identified piece of equipment and mapping/relational information for defining where the digital object is to display in the display 252 or image 254. The overlay is then transmitted to the client 250, which parses this overlay or overlay data to create an updated display 252.

Figure 3:
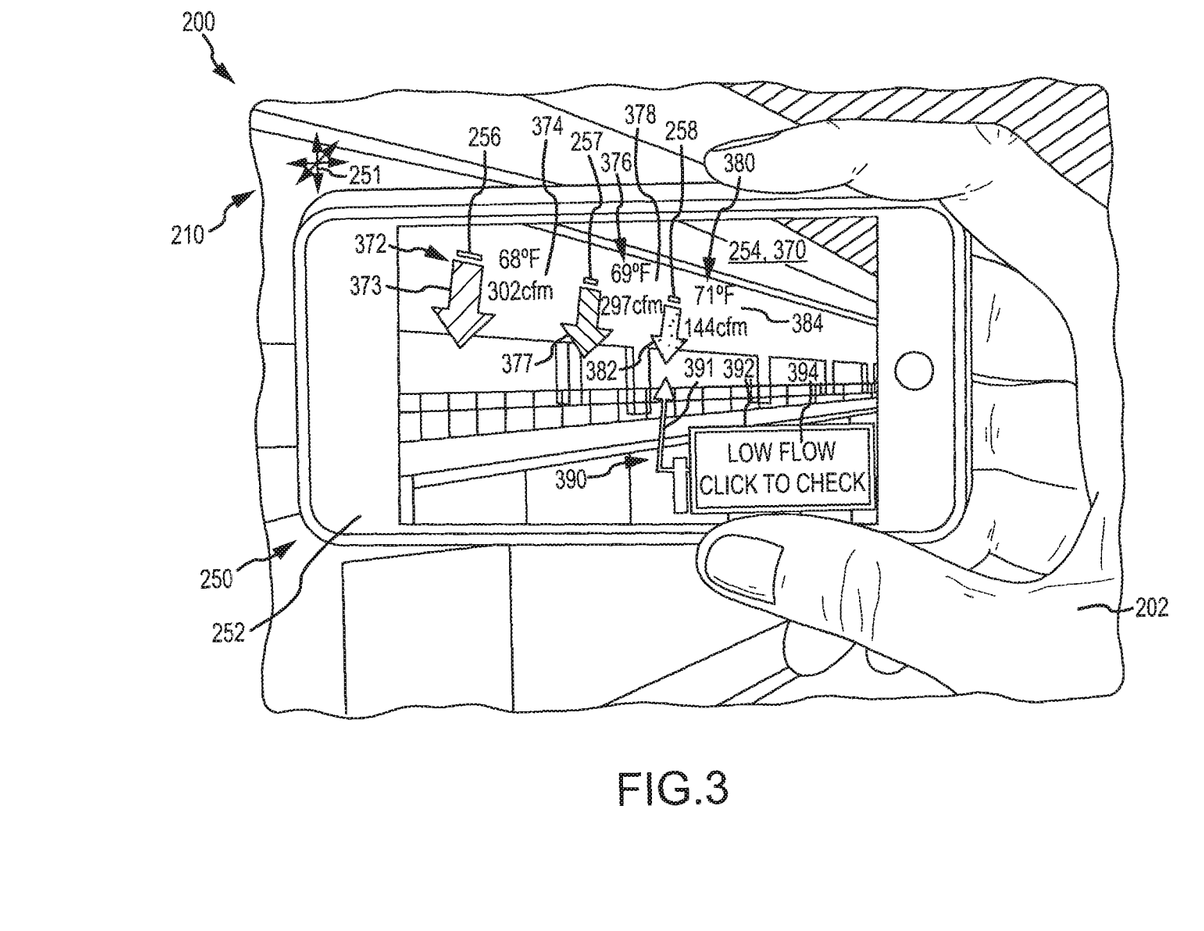

For example, FIG. 3 shows the client 250 after the client 250 has received the overlay data from the ARBOT server and has displayed the overlay 370 over the video image 254. As shown, the graphic or overlay 370 includes a digital object 372, 376, 380 that is associated with each of the diffusers 256, 257, 258, respectively, and is positioned proximate to these pieces of equipment in the image 254. Each object 372, 376, 380 includes a graphical portion 373, 377, 382 in the form, in this case, of an arrow that indicates direction of air flow from the diffusers and also may be colored or otherwise graphically coded to provide information (e.g., color coding is used in this example to indicate flow rate and whether the flow is within or outside of the desired flow range). Each object 372, 376, 380 also includes a textual portion 374, 378, 384 that provides a set of the building management data available from the building EMS for the diffusers 256, 257, 258, with the example of FIG. 3 showing a temperature and a flow rate as measured by one or more sensors (not shown in FIG. 3) in the building 210.

In this example, the diffusers 256, 257 are operating with flow rates within desired ranges as indicated both by the graphical portions 373 and 377 and by the textual portions 374, 378 of the objects 372, 376. However, the diffuser 358 is operating with low flow (out of range, for example) as shown by graphical and textual portions 382, 384. The ARBOT server may determine this fault or underperformance condition by processing the building management data from a building EMS (which may include a flag or fault for the diffuser 258 indicating the low flow condition) and create a fault indicator or warning icon 390 for the diffuser 258. The overlay 370 may include the icon or object 390 that includes a link component 390 linking it to the underperforming diffuser 258 and includes a box or button 392 that includes graphics or text providing building management data (e.g., text indicating the flow rate provided in object 380 is lower than desired for the building 210). The box 392 may also include in the text 394 or otherwise an indication that it is a selectable button that the user 202 may select or click via the touch screen 252 to request additional information on the diffuser 258 (e.g., an actuator in hand may be presented allowing the operator to adjust operation of the diffuser or related components to modify flow) or to record this problem and initiate further maintenance actions for the diffuser 258.

As can be seen in FIGS. 2 and 3, the operator 202 is able to simply point their device or client 250 at each diffuser 256, 257, 258 and a graphic overlay 370 appears allowing her 202 to quickly visualize supply air temperature and flow information. Panning 251 back and forth, the operator 202 may note that one diffuser 258 has flow that is much lower than the other diffusers 256, 257. The operator 202 may tap the screen 252 near the diffuser 258 of interest such as on button/box 392, and a window (not shown) may be displayed in overlay 370 that provides more diagnostic information for the diffuser 258 such as, in this case, a related variable-air volume (VAV) box.

Although no fault flag may be indicated in the building management data provided by the EMS to the ARBOT server and then in the overlay 370, the pressure point for the VAV box may be low. Then, the operator 202 may check a box on a graphical user interface (GUI) (not shown in FIG. 3) to note the potential problem in memory of the client 250 and/or the ARBOT server and/or the EMS database for the diffuser or related equipment. For example, the selection for follow up of a potential operating issue by the user 202 may cause a operator input (as shown at 152 in FIG. 1) to be transmitted from the ARBOT server (such as server 120 in FIG. 1) which forwards the data as a request (shown at 124 in FIG. 1) to a building EMS (such as EMS 110 of FIG. 1). In response, the EMS may register the problem with an issue tracking database and a variety of data may be stored to facilitate later diagnostics such as repair priority code, time and data the operator 202 noted problem, part description/identification, and the location of the equipment and/or building sensor that indicated the operating problem (such as a sensor, in this example, indicating low flow of diffuser 258 or low pressure of VAV box).

Figure 4:
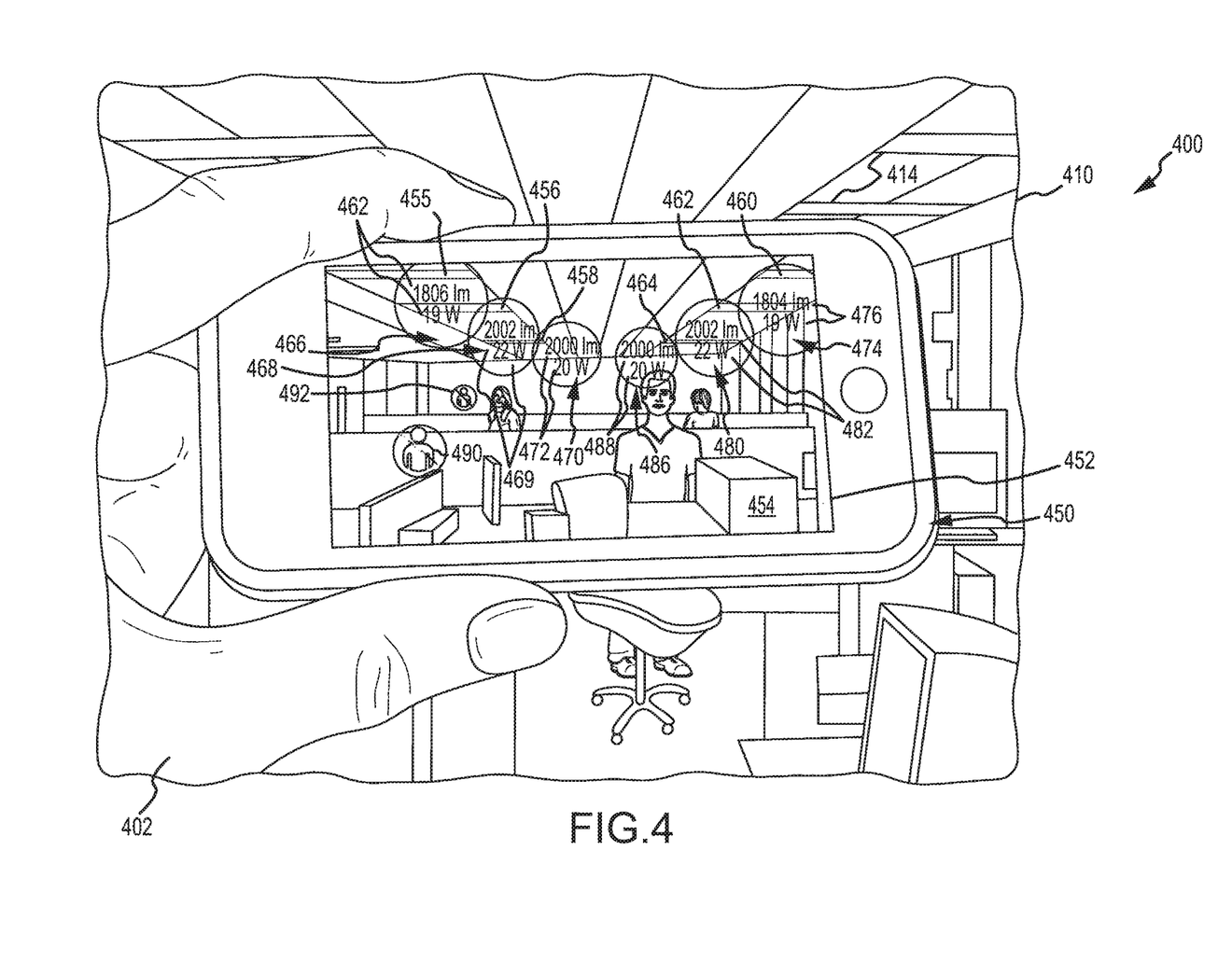
FIG. 4 illustrates a portion of a building management system showing an operator using a client device that communicates with an ARBOT server (not shown) to obtain a building management overlay for a live or presently-being-viewed image that including building equipment monitored and controlled by the building management system.

FIG. 4 illustrates a portion of a building management system 400 operating according to a second exemplary use case involving daylighting. As shown, the system 400 includes a client 450 carried and operated by an operator 402 into an office space of a building 410 that has a number of lights/ballasts 414 in a daylighting system. The client 450 includes a display screen 452, and the client 450 operates using its camera to display a video image 454 in the screen 452. The operator 402 is focusing or pointing the camera in the building 410 space such that a number of lights/ballasts 455, 456, 458, 460, 462, 464 are included in the displayed image 454 on screen 452.

The displayed image 454 includes a building management system overlay including objects (e.g., balloons/pop ups) 466, 468, 470, 474, 480, 486 that include a circle or balloon (graphical portion) overlain on the lights 455, 456, 458, 460, 462, 464. Within this graphical portion, a set of text or textual portion 467, 469, 472, 476, 482, 488 is provided by the ARBOT server and EMS database that includes building management system data (such as sensor readings indicating present power levels and lighting levels) associated with each corresponding and physically proximate light.

In the use case shown in FIG. 4, for example, an engineer 402 may be checking the results of his advanced daylighting system 414 that was deployed in building 410 some time ago. The engineer or operator 402 may have been confident in the results at the time of initial commissioning, but he may have received complaints from several occupants about light quality. The engineer 402 sweeps his PDA 450 across the open plan office space 410. In the displayed image 454 in addition to the office images, he is shown graphical indications of the relative luminous power and power consumption from the smart ballasts 455, 456, 458, 460, 462, 464 in the field of view of the camera of PDA 450. This indication is provided by the overlay in image 454 including visual objects 466, 468, 470, 474, 480, 486, which may also include additional information such as a record of the number of bulb changes. The overlay in image 454 may also include indications of building space occupancy such as with icons 490 indicating an occupied space/cubicle while icons 492 indicate a vacant space (where lower lighting levels may be more acceptable).

Moving around the space 410, the operator 402 may recognize from the information in the overlay in image 454 that the luminous power indicated in a heavily occupied corner of the office is low. The operator 402 may request further information on one of the lights 455, 456, 458, 460, 462, 464 such as light 455 by tapping, with his finger, a stylus, or the like, the screen 452 where the object 466 is displayed. In some cases, the ARBOT server may respond to this user input by pushing a daylighting control GUI for display on screen 452 in image 454 or in a separate window. The operator may interact with the displayed control GUI by operation of the PDA 450 to control operation of the light 455 such as by adjusting gain until he and the occupants of the space 410 are satisfied with the level of illumination. The operator 402 may also enter input to the client 450 and/or ARBOT server to save or calendar a note to check this area 410 later in the day or at a particular later time.

Figure 5:
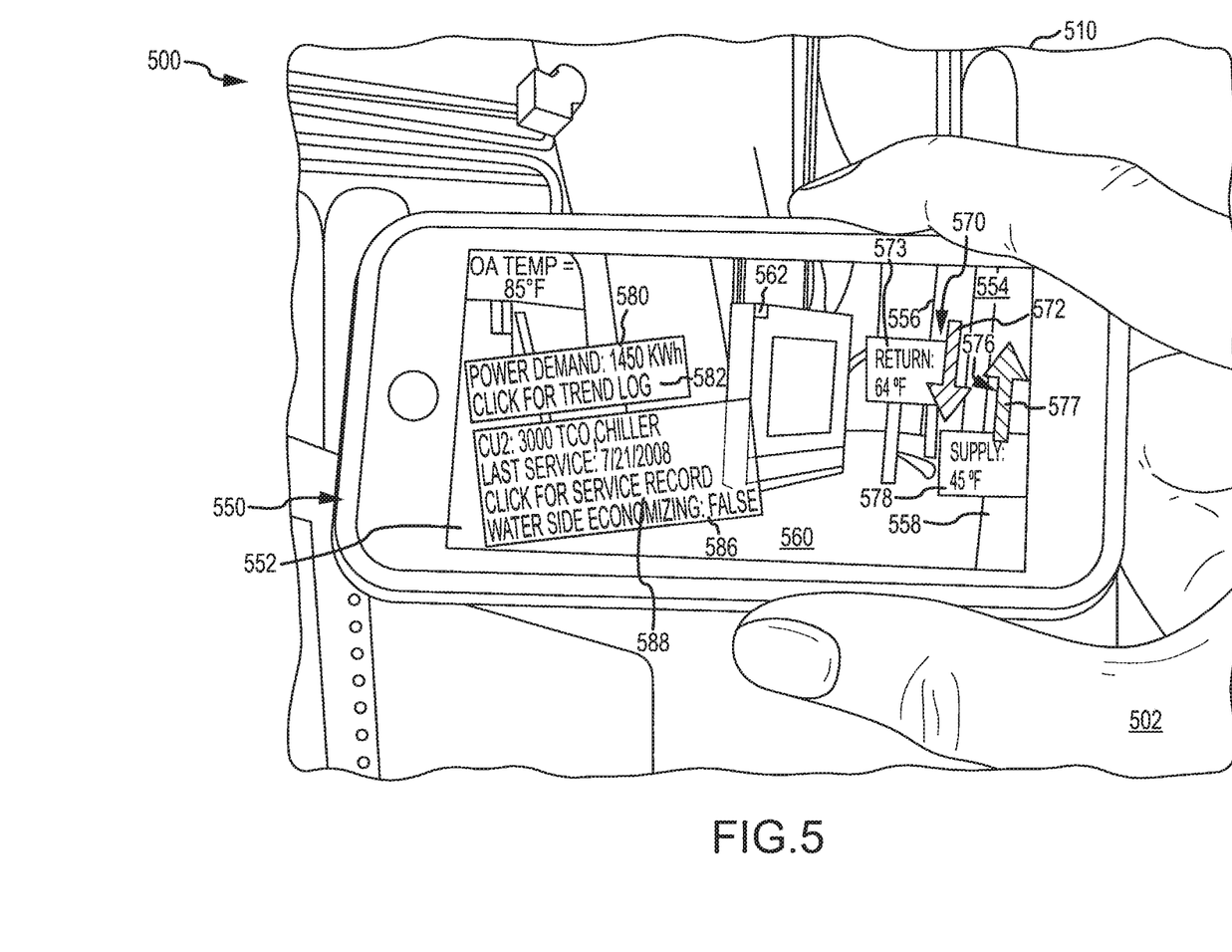
FIG. 5 illustrates, similar to FIGS. 3 and 4, a portion of a building management system showing an operator operating a client onsite within a building to identify equipment to an ARBOT server and to receive and view, in real-time and while still onsite, a building management overlay with the overlay of FIG. 5 showing use of interactive buttons or objects that may be selected (or clicked) to obtain more information from the ARBOT server (and/or from the building EMS and its main database) with an updated overlay or via an additional window on the display of the client.

FIG. 5 illustrates another exemplary use case involving ARBOT use for chiller diagnostics. A portion of a building management server 500 is shown in which a client 550 is operated by a user 502 to inspect a building space 510 and to communicate with an ARBOT server and building EMS servicing the space 510. The client 550 includes a display screen 552 on which the client 550 is operating via a camera to present video display 554 of the space 510 with a building management overlay. As seen in the display 554, the space 510 includes a chiller 560 with inlet/return piping 556 and outlet piping 558. A fiducial marker 562 is provided on the chiller's control panel to allow a software module on the client 550 or on ARBOT server to process the data of image 554 and identify the chiller 560. This identification is then used to retrieve building management information for the chiller that is then included in overlay portion of the image 554 on display 552, and the location of the marker 562 is used by the ARBOT server in mapping the objects of the overlay to the equipment 556, 558, 560 in space 510.

The overlay includes return line object 570 that includes graphical portion 572 in the form of a red arrow showing flow direction (with red showing that the flow is return fluid) and also text box 573 with text based on the building management data from the EMS database for chiller 560 (e.g., return temperature as indicated by sensor data provided to the building EMS). The overlay also includes outlet line object 576 that includes graphical portion 577 in the form of a blue arrow showing flow direction (with blue indicating that the flow is outlet fluid at a lower temperature) and also text box 578 with text based on the building management data from the EMS database for chiller 560 (e.g., outlet temperature for the chiller as indicated by sensor information). The overlay on the video image in displayed image 554 includes additional text boxes 580, 586 for the chiller 560 providing additional management data in the form of text 582, 588 such as power demand for the chiller 560, chiller ID information, last service date, operational data (whether water side economizing is operating), and the like. Further, each of the boxes 580, 586 may be configured as selectable buttons that the user 502 may select (e.g., with a finger, a stylus, or the like) to request additional information such as a trend log (as shown at 582), a service record (as shown at 588), diagnosing procedures, manufacturer-provided information, and the like.

As shown in FIG. 5, a technician 502 may be responding to a temperature complaint from an occupant of the building 510 that is serviced by chiller 560. The technician shows up at the occupant's office and uses his client 550 or another method to quickly determine the space temperature is indeed too high for comfortable occupancy. He walks down the hallway from the office using his client/phone 550 to "see" temperatures, pressures, and flows in the ductwork by periodically pointing his client/phone 550 at the wall or ceiling and receiving building management overlays in viewed images of the ductwork or other points associated with local sensors providing data to the building EMS. He may trace a path to a chiller unit 560 (or go more directly to the chiller unit) and obtain the image 554 in the client's display 552.

At this point, he views or looks at the chiller 560 through his phone/client 550 and decides it is working normally (or is working abnormally at which point he may correct a problem identified in the overlay data). He inspects other temperatures and flows in the vicinity with the client 550 and suspects that a particular economizer damper has stuck in the open position. He may then tap the screen 552 to put the damper in hand or in the display screen 552 in a video image with an overlay including building management information to verify the damper is in fact stuck open. The client 550 may then be operated via a tap or selection on a GUI to bring up additional building management information useful for addressing the identified problem (e.g., stuck damper) such as a list of parts, tools, and instructions to make the repair—all of which may be displayed in the display 552 while the operator 502 is in the vicinity or position of the problematic damper. In this way, the operator 502 is able to quickly diagnose the problem by himself (without calling another operator to access a building EMS) even though the EMS terminal was located far from the problem area 510 (or in ducting serviced by chiller 560) and even though the various points in the building systems that he checked to identify the problem were scattered throughout the building (and, likewise, throughout the EMS database).

Figure 6:
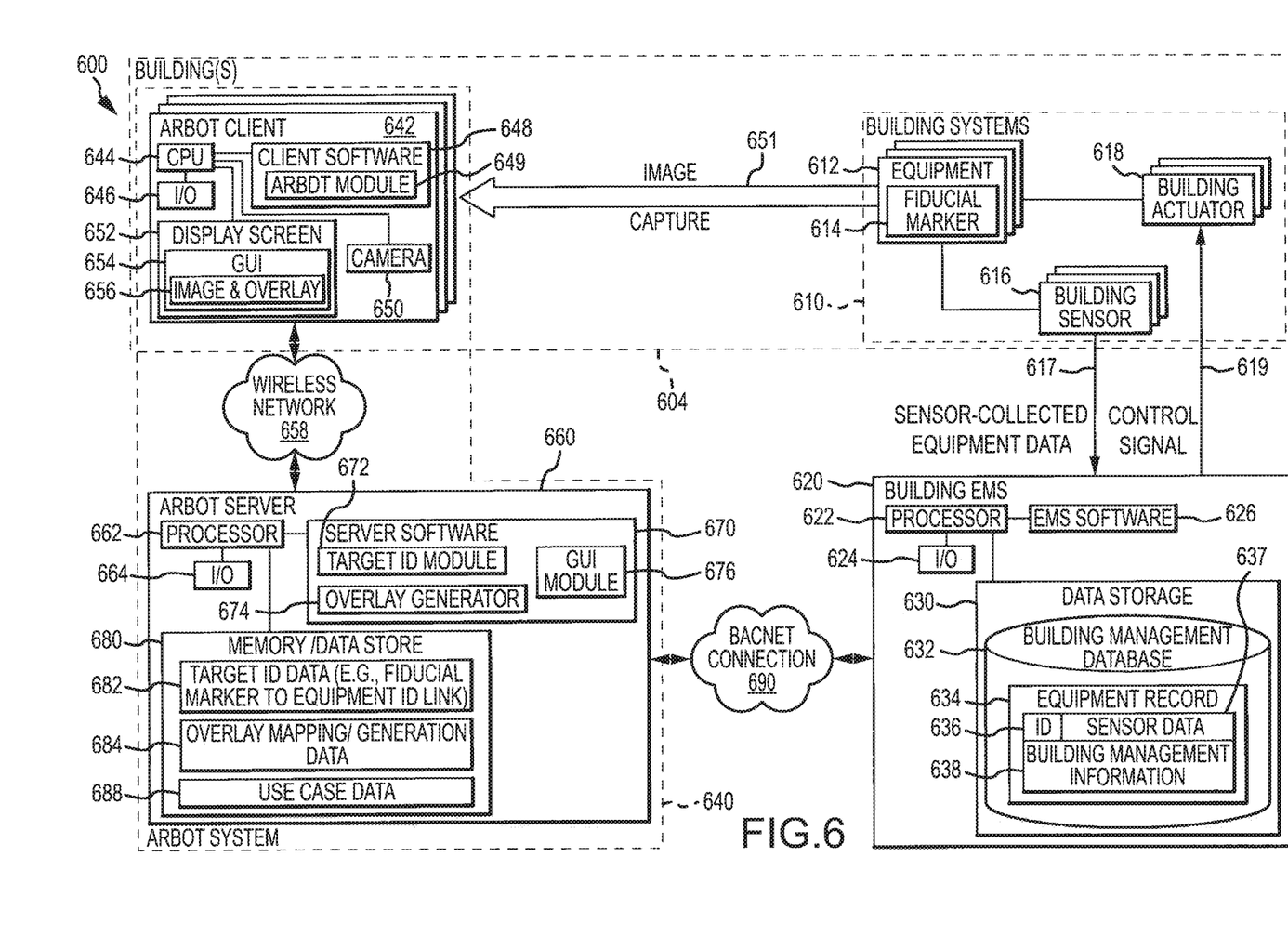
FIG. 6 illustrates, in functional block form, a building management system that may be used to provide the ARBOT tool to building operators and their personnel.

With these use cases understood and in the reader's mind, it may be useful now to explain in more detail functionality of the various components of a building management system that is implementing the ARBOT tool and methods with discussion of exemplary software and hardware devices that may be used to provide these functions. FIG. 6 illustrates in functional block form a building management system 600. Generally, the building management 600 includes a building(s) 604 that house or are operated by building systems 610 such as HVAC, lighting, and other typical building systems. The systems 610 include equipment 612 such as lighting systems, HVAC components, and so on that each may include identification elements such as fiducial markers that facilitate their identification in a captured image 651. Building sensors 616 may be associated with the equipment 612 and collect data 617 that is transmitted (wirelessly or in a wired manner) to a building EMS 620. Further, the building systems 610 include controllers or actuators 618 that can be used to operate the equipment 612 such as remotely by the building EMS via control signals 619 (which may be generated automatically based on sensor data 617).

The building management system 600 also includes a building EMS 620 that may be a computer system with a processor 622 running a suite of EMS software 626 and managing one or more input/output (I/O) devices 624 for communicating 617, 619 with the building systems 610 as well as with an ARBOT server 660 (such as via a BACnet connection or the like 690). The building EMS 620 includes data storage devices 630 that store a building management database 632 with records 634 for the equipment 612 and systems 610. For example, a record 634 may store an identifier (serial number or the like) 636 for each piece of equipment 612 and sensor data 637 received from the building sensors 616 is stored in the record 634 as may be one or more pieces of building management information 638 (e.g., tuning processes for a controller, operational settings for equipment 612, maintenance/operational histories, and so on).

The EMS 620 may function to provide control of building systems via signals 619 of building system flows, space temperatures, humidity, lighting, security, and the like. The EMS software 626 may provide this function as well as performing management of operating schedules, which may be stored in data storage 630 or in other memory/data stores. The EMS software 626 may further cause the EMS 620 to issue basic alarms and provide event notifications (such as over connection 690) to building operators based on processing of sensor data 617, e.g., when equipment 612 is determined to be operating in an undesirable manner such as out of a predefined operating range such as at high or low pressure/temperature. The EMS system 620 may function via software 626 to perform trend logging of the building systems 610.

Of more interest with regard to this description, the EMS system 620 may also be adapted via EMS software 626 and I/O 624 to transmit requested point data to the ARBOT server 660 (e.g., provide requested sensor data 637 for a piece of equipment 612 or building management information 638 for the same or other related equipment in a building system 610). Also, the building EMS 620 may act to respond to controller interaction requests from the ARBOT server 660 to issue control signals 619 to actuators 618 such as gain changes, actuator overrides, and the like initiated via an operator of an ARBOT client 642 via a GUI 654 or other input mechanism.

To implement the ARBOT tool/methods described herein, the building management system 600 further includes an ARBOT system 640 made up of one or more ARBOT clients 642 and an ARBOT server 660. Each ARBOT client 642 may be any of a number of wireless communication devices that communicates with the ARBOT server 660 over a wireless connection 658. For example, the client 642 may take the form of a smart phone such as the iPhone™ available from Apple Inc., the DROID™ available from Motorola, or a similar device available at the time of the filing of this application or a later developed computing device with video capture and display and wireless communication capabilities. The wireless network/connection 658 may be any type of computer network that is wireless such as wireless local area network (LAN), a mobile device network (such Global System for Mobile Communications (GSM)), or the like.

The ARBOT client 642 includes a CPU/processor 644 running client software 648 including an ARBOT module 649. The ARBOT client 642 manages operation of I/O devices 646 that provide the wireless communications over network 658 to ARBOT server 660 and process operator inputs via a variety of devices such as touch screen 652, keypads, voice recognition devices, a mouse, and so on that may be part of I/O 646. The CPU 644 also manages operation of a display or touch screen 652 that may be used to display a GUI 654 to a user of client 642 such as with use case information for building management and also to display images 656 with or without overlay of building management information from ARBOT server 660. A camera 650 is provided for capturing 651 images (e.g., video images) of the equipment 612 of building systems 610 including images of fiducial markers 614 in some embodiments.

The ARBOT client 642 with ARBOT module 649 generally functions to communicate with the ARBOT server 660 including communication of targets 612 to the server 660. An image 651 may be captured by the camera 650 and displayed in the image 656 of screen 652. The ARBOT module 649 may forward this image over wireless network 658 to the ARBOT server 660 for processing and target identification.

In some embodiments, though, the ARBOT module 649 may be configured to provide image and supplemental data processing for target identification and, in such cases, the target ID is provided to the ARBOT server with a request for a building management overlay for the targeted equipment 612. For example, when fiducial markers 614 are present, this data or image may be transmitted by the client 642 to a server for lookup of the equipment ID based on a matching of the marker data. A fiduciary marker or fiducial is an object used by image processing software (such as target ID module 672 of ARBOT server 660 or ARBOT module 649) to provide a point of reference in an image (e.g., the fiducial may be at a known location on a piece of equipment to facilitate later mapping/alignment of overlay information) and also to allow the object/equipment to be recognized in the image 651 by providing a unique set of data. In other cases, the module 649 may determine the ID of the target equipment 612 based on a determined location of the client 642 within the building 604 such as through the use of GPS and/or compass functionalities on the client 642 (such as for rooftop or outdoor equipment 612), through Wi-Fi triangulation or similar client movement algorithms, or the like.

The ARBOT module 649 further functions to parse information received from the ARBOT server 660 and to provide digital information overlay and scene display 656 on display screen 652. The ARBOT module 649 may also generate/display a GUI 654 that the user of client 642 may use for performing contextually interactive tasks with ARBOT server 660 (e.g., to request further building management information, to indicate that equipment 612 needs to checked/worked on a later date, and so on).

The ARBOT server 660 provides a large portion of the ARBOT method functionality in system 600. The ARBOT server 660 may be a server or computer with a processor 662 that manages functioning of I/O devices 664 including those used to provide wireless communications over network 658 with clients 642 and communications with building EMS 620. The processor 662 runs or executes code (or programs in computer readable medium) that provide the server software 670. To provide an ARBOT, the software 670 may include a target ID module 672 functioning to process image and/or other data from a client 642 to identify a target 612 in a building system 610. For example, the server 660 may include memory/data store 680 used for storing target ID data 682 in the form of records with fiducial marker data and equipment IDs.

The software 670 may further include an overlay generator 674 that acts to request, with the target ID, sensor and/or building management data 637, 638 from the building EMS 620. The generator 674 then acts to use overlay mapping/generation data 684 in memory 680 along with the returned building management data to create an overlay (or overlay data) to send to the client 642 for parsing by ARBOT module 649 and use in display 656. This may include mapping the coordinates for particular building management data with an identified piece of equipment such as by assigning X-Y-Z coordinates to an overlay object based on a known location of a fiducial marker associated with the target in the image 656.

The server software 670 also includes a GUI module 676 that may be used to generate GUI or GUI data for transmittal to the client 642 for use in presenting a GUI 654. For example, the GUI module 676 may access use case data 688 in memory 680 for the identified target equipment 612 and generate a use case-driven GUI 654 or sets of overlays 656 that allow a user of client 642 to take steps (such as those discussed above in reference to the use case examples) to interact with building management data from EMS 620 while viewing or being proximate to the equipment 612.

As can be seen from FIG. 6 when considered with the prior description, it can be seen that the ARBOT server 660 implements an AR building operations tool by providing equipment/EMS point mapping database management. The ARBOT server 660 also provides contextual data extraction of building management data based on a client target assay. Further, the ARBOT server 660 can act to provide use case-driven information synthesis, diagnostics, and prognostics. The ARBOT server 660 communicates building management data to the client 642. The ARBOT server 660 also manages interaction requests for the EMS 620 received from the client 642 (e.g., requests for additional management information for a piece of equipment 612 that appears to be underperforming), and, as part of this task, the server 660 manages communications with the EMS 620 for the client 642 (e.g., such accessing of database 632 is transparent to client 642). The ARBOT server 660 may also report equipment and building management information to an external asset management system (not shown in FIG. 6) and/or an external data mining system (not shown in FIG. 6).

In some embodiments, the server software 670 may include plug-ins from manufacturers of equipment 612 that provide building management data (or that identify what type of data to retrieve from EMS 620). For example, a manufacturer for an A/C system may provide an interactive maintenance procedure that may be provided to the client for display in image 656 when the equipment 612 includes the A/C system and when sensor data 637 and/or management information 638 retrieved from EMS 620 indicates the procedure to be performed (e.g., operation out of predefined ranges indicating maintenance is required). In this manner, equipment manufacturers may create content for the server software 670 to facilitate providing a tailored and full function ARBOT system 640.

Figure 7:
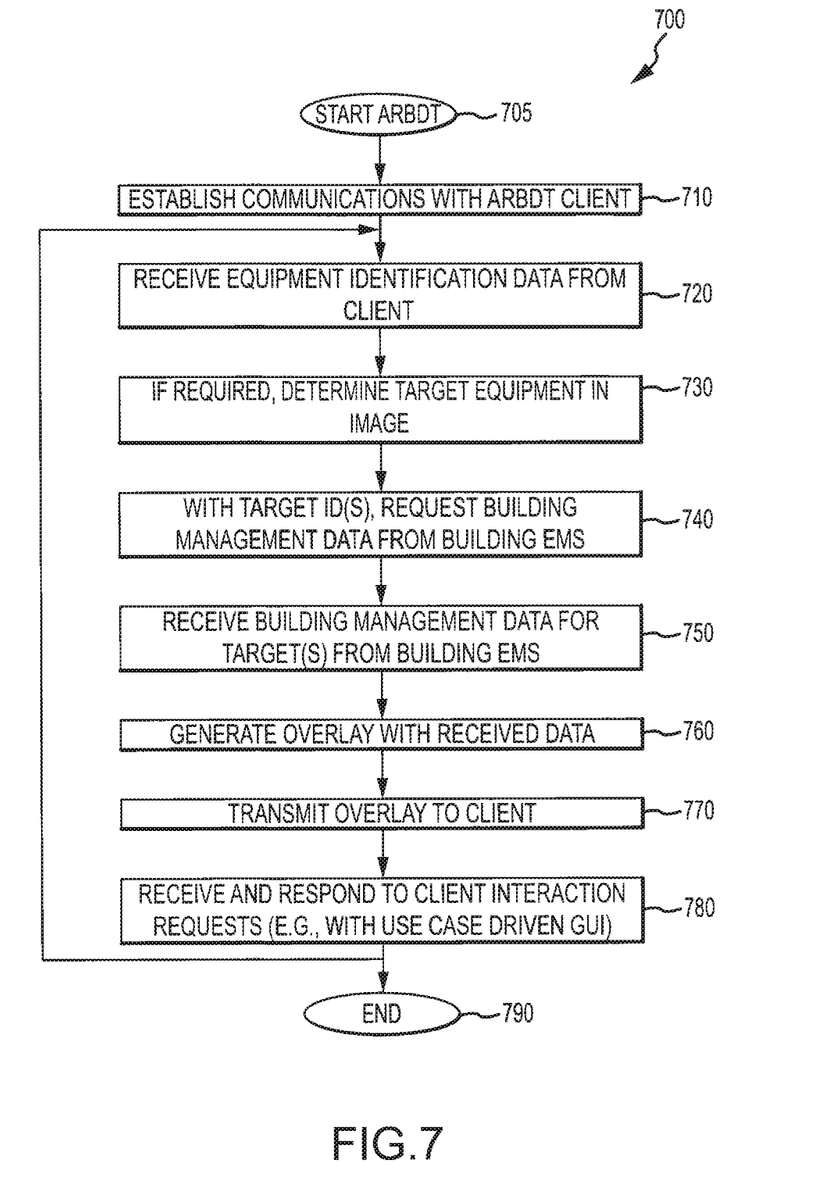
FIG. 7 is a flow diagram showing an ARBOT process carried out by an exemplary ARBOT server such as that shown in FIGS. 1 and 6.

FIG. 7 illustrates operation 700 of an ARBOT server such as server 660 to provide an ARBOT tool for managing building systems and equipment of such systems. The method or operations 700 start at 705 such as with providing an ARBOT server 660 with server software 670 that is communicatively linked with a building EMS 620 and by loading, as necessary, ARBOT modules 649 on clients 642. The method 700 continues at 710 with establishing communications over a network 658 with a client 642 such as with a user of client 642 clicking or selecting a button/icon on a GUI 652 of touch screen 652 to start an ARBOT session.

The method 700 continues with the server 660 receiving from the client 642 information that identifies or can be used to identify the targeted equipment 612. The method 700 then continues with the server 660 determining the identification of the equipment 612. This may simply require parsing the information received from the client 642 when the client performs the task of identifying the equipment 612. In other cases, though, the client 642 may forward video/image data 651 that it captures with camera 650 to the server 660 for processing at 730 with target ID module 672 to identify the equipment 612. As discussed above, this may be done by identifying a fiduciary marker 614 in the image 651 and determining with a look up to data 682 the ID of equipment 612. Note, identification may also be based upon positional information, dead reckoning navigation, WiFi triangulation, and/or other techniques.

Once the equipment is identified, the method 700 continues at 740 with the server 660 requesting building management data from the building EMS 620 such as a set of sensor data 637 indicating present operating conditions for the equipment 612 and/or other building management information 638 for the equipment 612 (such as tuning processes for a controller, historical alert information, and so on). This data is received at 750 and then at 760 the server 660 uses its overlay generator 674 and overlay mapping/generation data 684 to generate an overlay including objects associated with each targeted component 612 in the image 651 (with each object typically being mapped to the equipment's location in the image so as to be displayed in image 656 near or in a linked manner with the image of the equipment 612 such as with a popup balloon or box near the equipment image).

At 770, the server 660 transmits the overlay (or overlay data such as object data and its X-Y-Z coordinates) to the client 642 for use in display 656. At 780, the server 660 may receive a request from the client 642 for additional information regarding managing the equipment based on the previously provided overlay of building management data. For example, the overlay may include a button/icon that can be selected by the user via operation of the screen 652 to request more information on a piece of equipment 612 (e.g., process to perform diagnostics on the equipment as provided by the manufacturer, an actuator-in-hand allowing operation of an actuator 618 via signals 619, and so on). The server 660 may respond to the request after accessing the EMS 620 for the requested building management information or accessing a third party server (e.g., a manufacturer's server for additional equipment-related data). The method 700 may then end at 790 or continue at 720 with receiving additional equipment information/requests such as by the user of client 642 targeting different equipment 612 with the camera 650 and capture differing images 651.

Embodiments of the subject matter described in this specification can be implemented as one or more computer program products, i.e., one or more modules of computer program instructions encoded on a computer-readable medium for execution by, or to control the operation of, data processing apparatus. For example, the modules used to provide the ARBOT such as target ID module 672, overlay generator 674, and GUI module 676, and the like may be provided in such computer-readable medium and executed by a processor or the like. The computer-readable medium can be a machine-readable storage device, a machine-readable storage substrate, a memory device, a composition of matter affecting a machine-readable propagated signal, or a combination of one or more of them. The term "ARBOT server" encompasses all apparatus, devices, and machines for processing data, including by way of example a programmable processor, a computer, or multiple processors or computers. The system (such as systems 100 and 600 of FIGS. 1 and 6) can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit). Processors suitable for the execution of a computer program include, by way of example, both general and special purpose microprocessors, and any one or more processors of any kind of digital computer. Generally, a processor will receive instructions and data from a read-only memory or a random access memory or both. Generally, the elements of a computer are a processor for performing instructions and one or more memory devices for storing instructions and data. The techniques described herein may be implemented by a computer system configured to provide the functionality described.

For example, FIG. 6 is a block diagram illustrating one embodiment of a system 600 with ARBOT clients 642 and ARBOT server 660 configured to implement the methods described herein. In different embodiments, the system and its components/elements may be any of various types of devices, including, but not limited to a personal computer system, desktop computer, laptop, notebook, or netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, or, in general, any type of computing or electronic device.

Typically, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, a digital camera, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user (with an I/O portion 646 of client 642 or I/O 664 of server 660 or the like), embodiments of the subject matter described in this specification can be implemented on a computer having a display device, e.g., a CRT (cathode ray tube) or LCD (liquid crystal display) monitor, for displaying and receiving input such as with a touch screen, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While a number of exemplary aspects and embodiments have been discussed above, those of skill in the art will recognize certain modifications, permutations, additions, and sub-combinations thereof. It is therefore intended that the following appended claims and claims hereafter introduced are interpreted to include modifications, permutations, additions, and sub-combinations to the exemplary aspects and embodiments discussed above as are within their true spirit and scope.

As described, systems and methods are provided for achieving an AR building operations tool. An AR visualization client is provided on a smart phone platform alongside a database server connected to a production EMS in a building. The ARBOT server may leverage the BACnet standard to enable interoperability with a range of vendor EMS products. The ARBOT system provides an operations aid for a technician working in situ as they are provided building management data from the EMS while still in the building in a context-adaptive presentation on their mobile client. The ability to use a mobile device to interact with information and physical devices is a natural and powerful extension of AR technology for building system applications.

The ARBOT systems described herein address a number of challenges including: (1) identifying the target equipment using information received from the client; (2) retrieving contextually appropriate data with the identified equipment from an EMS; and (3) synthesizing and presenting the retrieved data in concert with real-time images on the client.

Some implementations may rely upon fiducial markers (e.g., distinct images placed in the field of vision of the client) to identify targets and later register digital information (such as overlay objects with building management data) within the frame displayed on the client's display screen. In other cases, though, more sophisticated and unobtrusive mechanism such as network triangulation, inertial dead reckoning, embedded compasses in the client, and/or radio frequency identification (RFID) techniques may be used to identify the target equipment (by the client, by the ARBOT server, or a combination thereof). The ARBOT server may include a database that maps the layout of the building and fiducial/fiduciary markers with the range of sensor information available from the EMS so that the server can create an overlay that properly maps the objects containing building management data to the equipment in the images displayed on the client.

The invention claimed is:

1. A method, comprising:
   with an augmented reality building operations tool (ARBOT) server, receiving from a mobile client in a building an augmented reality request for equipment of a building system that is managed by an energy management system (EMS);
   in response, receiving, at the ARBOT server from the EMS, building management data for the equipment of the building system;
   with the ARBOT server, generating an overlay with at least one object based on the building management data, wherein the overlay is configured for concurrent display on a display screen of the mobile client with a real-time image of the equipment in the building;
   transmitting the overlay to the mobile client for display with the real-time image of the equipment,
   wherein a display location of the at least one object in the overlay is aligned with a position of the equipment in the real-time image such that the at least one object is displayed in the display screen proximate to or at least partially overlaying the real-time image of the equipment;
   after the transmitting of the overlay to the mobile client, receiving a client interaction request from the mobile client including a user selection of the at least one object in the overlay; and
   operating the ARBOT server to obtain additional building management data for the equipment associated with the at least one object in the overlay and to provide the additional building management data to the mobile client for display on the display screen.

2. The method of claim 1, wherein the augmented reality request includes an identification of the equipment and wherein the building management data includes collected data from a sensor in the building operating to monitor operation of the identified equipment.

3. The method of claim 2, wherein the identification of the equipment is determined by processing a fiducial marker in the real-time image or based upon a determined position of the mobile client.

4. The method of claim 1, wherein the additional building management data includes an actuator-in-hand associated with the equipment.

5. The method of claim 1, wherein the additional building management data is presented to the mobile client as an additional overlay for display in the display screen.

6. The method of claim 1, wherein the overlay includes a selectable icon requesting operator input and wherein the ARBOT server responds to selection of the selectable icon by storing in memory an action item associated with the equipment.

7. A building management system for use with an energy management system (EMS) storing building management data associated with building system components in a building, comprising:

a server with a processor running ARBOT software and communicatively linked to the EMS; and wherein a client, positioned in the building and wirelessly communicating with the server, displays an image of one of the components on a display screen, wherein the server accesses the EMS to retrieve building management data associated with the displayed component, the server generates an overlay for the displayed image that includes an object based on the retrieved building management data and transmits the overlay to the client, wherein the client updates the display screen to concurrently display the image of the component and the overlay, with the overlay being displayed to be proximate to or overlaying the image of the component on the display screen, wherein the server stores use case data for a plurality of the components including diagnostic or maintenance processes, wherein the server processes data received from the client to identify the component, and wherein the overlay includes at least a portion of the use case data for the identified component, wherein the overlay includes an interactive element receiving input from an operator of the client requesting additional information from the EMS, and wherein the server retrieves the additional information from the EMS and creates an additional overlay for the display by the client over the image based on the additional information.

8. The system of claim 7, wherein the building management data includes operating data for the component collected by a sensor in the building.

9. The system of claim 7, wherein the building management data includes diagnostic or maintenance information for the component that is provided in the object.

10. The system of claim 7, wherein a display location of the object is aligned in the image to a location in the image of the component and includes a portion indicating an operating state of the component with a graphical element.

* * * * *